Figure 1:
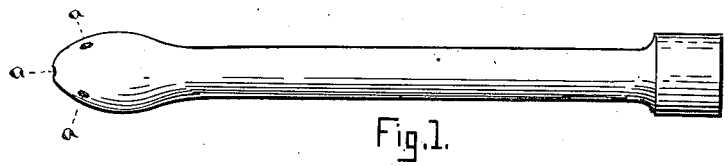

(No Model.)

T. J. MAYALL.
SYRINGE EDUCTION TUBE.

No. 286,041. Patented Oct. 2, 1883.

Witnesses:
Ch. Houghton
J. F. Pickering

Inventor:
T. J. Mayall

UNITED STATES PATENT OFFICE.

THOMAS J. MAYALL, OF READING, ASSIGNOR TO THE BRUNSWICK ANTIMONY COMPANY, OF BOSTON, MASSACHUSETTS.

SYRINGE EDUCTION-TUBE.

SPECIFICATION forming part of Letters Patent No. 286,041, dated October 2, 1883.

Application filed March 19, 1883. (No model.)

*To all whom it may concern:*

Be it known that I, THOMAS J. MAYALL, of Reading, in the county of Middlesex and Commonwealth of Massachusetts, have invented a new and useful Improvement in the Points or Eduction-Tubes for Vaginal and other Syringes, of which the following is a specification.

My invention relates to the material of which the syringe-point or eduction-tube is made and the manner of making it, the object being to produce a syringe-point or eduction-tube which shall be free from any metallic connection, and which will be so flexible that it may be entered into any passage, however crooked or obstructed, if not wholly closed, without injury or pain to the patient; and it consists in making the syringe-point or eduction-tube wholly of the rubber compound hereinbelow described, or other suitable compound of rubber or other gum or material which can be cured or vulcanized, and without metallic parts or screw-joints to connect it with the body of the syringe.

Heretofore the points or eduction-tubes of vaginal and other syringes have usually been made of metal or of hard rubber, with a screw or other joint to connect them with the body of the syringe. The objectionable features of a metallic point for a syringe are obvious and need not be detailed here.

To make my improved syringe-point I take as preferable a compound of pure rubber and penta-sulphide or golden sulphuret of antimony, thoroughly combined and mixed by the usual process of grinding rubber compounds, and shape it in a mold, the inside form and dimensions of which are exactly what is required for the outside form and dimensions of the syringe-point when finished. Within such a mold I place in its center on its axial line a spindle of the form and dimensions required for the passage through the syringe-point. On the rear of this spindle is made the form of a screw, which is identical in form and dimensions with the screw on the front end of the body of the syringe, to which the point is to be applied. The mold and central spindle are secured in their relative positions and closed in any suitable way, and the space between them filled with the plastic compound of rubber and penta-sulphide of antimony or other suitable compound. If it is desirable to have more than one discharge-opening at the forward end of the syringe-point, as many short supplementary spindles as may be required to make the desired discharge-openings may be set in holes in the forward end of the central spindle, so as to stand at an angle less than a right angle to the axial line of the spindle and reaching to the inner surface of the shell of the mold. As it may be desirable to make the extreme forward end of the syringe-point and the rear end of it, where the screw is, a little harder, when cured, than the tube between these points, I add at these ends, when the rubber compound is placed in the mold, a quantity of free sulphur in a pulverized condition sufficient to give them the required condition of hardness when cured, which is a little harder than the tube, which must be flexible and elastic and so soft that it will not cause pain in the parts it is in contact with. When the mold for the syringe-point is filled with the compound of rubber and penta-sulphide of antimony, it is placed in a vulcanizing-oven and cured for about an average period of four hours at a temperature of about 250° Fahrenheit, or for such time and to that degree which will leave the tube of the syringe-point soft and flexible and elastic, and the ends a little harder, so that the screw will engage and hold the screw on the main body of the syringe to which it will be affixed, and the forward end of the point will retain its shape against a moderate pressure. When this syringe-point is cured, it is ready for use, and can be affixed to any syringe-body having a screw to correspond with the screw on it.

A syringe-point made in this way will enter the vaginal or other passages in the body to which its size is adapted without causing pain or injury to the parts, and is especially useful in cases where the passage has become crooked or inflamed in consequence of tumors or temporary swellings; and it may be made of all sizes, so as to be adapted to the ear and nose.

Figure 2:
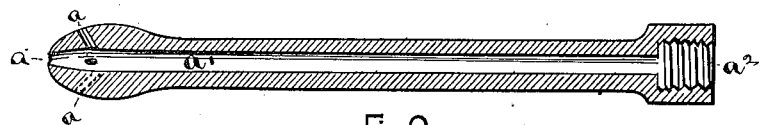
Figure 3:
Figure 4:
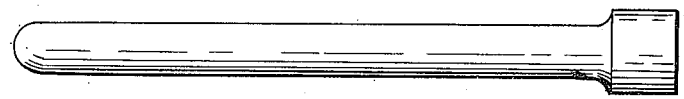
Figure 5:
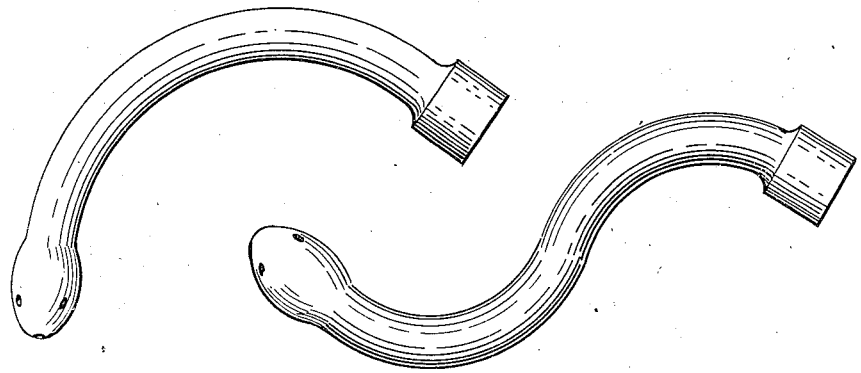

In the drawing annexed, Figure 1 shows a side view of a syringe-point or eduction-tube with a bulbous end. Fig. 2 shows a longitudinal section of the same on the line of its axis. Fig. 3 shows a forward end view of the syringe part with the eduction-openings in it. Fig. 4 is a side view of a syringe-point without the bulbous forward end. Fig. 5 shows side views of syringe-points with the bulbous forward ends as bent by entering a crooked passage.

A indicates the eduction-openings in the forward ends of the syringe-point.

A' indicates the passage in the syringe-point through which the fluids in the syringe are conducted to the desired parts.

A² is the screw in the rear end of the syringe-point by which it is affixed to the body of the syringe.

I claim as new and of my invention—

1. The above-described improved syringe-point or eduction-tube, made of rubber and penta-sulphide of antimony compound cured by heat, substantially as set forth.

2. A syringe-point made of rubber and antimony compound cured by heat, and having a screw formed in its rear end, by which it may be affixed to the body of the syringe, the ends of said syringe-point being made harder than the main body thereof, substantially as set forth.

THOS. J. MAYALL.

Witnesses:
 CHS. HOUGHTON,
 J. F. PICKERING.